United States Patent Office 3,315,127
Patented Apr. 18, 1967

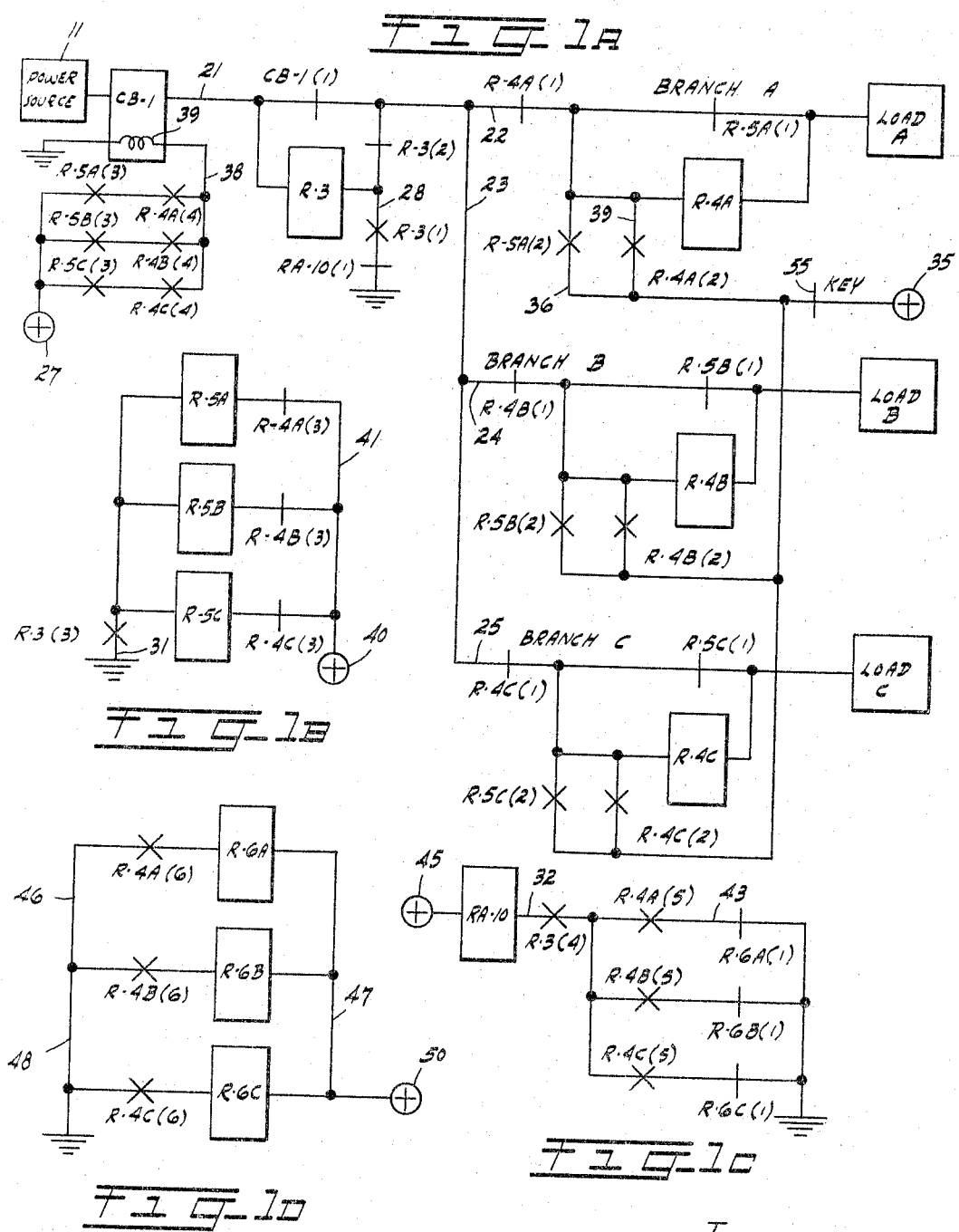

3,315,127
RESTORING CIRCUIT MEANS FOR ISOLATING THE DEFECTIVE BRANCH AND RECONNECTING THE REMAINING BRANCHES
Otto Lenz, Raytown, Mo., assignor to Western Electric Company, Incorporated, New York, N.Y., a corporation of New York
Filed Mar. 4, 1964, Ser. No. 349,363
2 Claims. (Cl. 317—22)

This invention relates to power restoring circuits and, more particularly, to a multi-branch circuit capable of restoring power to all branches other than a defective branch immediately after a fault occurs.

Such a multi-branch circuit has general utility. For example, it may advantageously be employed in combination with a common power supply and a number of associated branch circuits to make extended period or life tests on a plurality of electrical components, devices or circuits, or to operate a number of electrically driven apparatus independently at unattended stations.

Heretofore, there has been no simple power restoring circuit comprising a minimum number of passive elements, such as relays, capable not only of supplying voltage from a common source to and continuously monitoring a plurality of branch circuits for the occurrence of a fault, such as a short, but upon the occurrence of a fault in any branch to disconnect power momentarily from all of them, immediately thereafter detect which branch or branches are defective, isolate the defective branch from the source and then restore power to all of the remaining branch circuits.

Accordingly, it is an object of this invention to provide a multi-branch power restoring circuit capable of momentarily removing power from all of the branches upon the occurrence of a fault, to detect which branch is defective, and immediately thereafter to re-establish power to all other branches.

It is another object of this invention to provide a multi-branch power restoring circuit which is uniquely simple and inexpensive, and which requires a minimum number of circuit relays.

In accordance with the principles of this invention as embodied herein, the power restoring circuit comprises a main relay responsive to the operation of a circuit breaker, three interrelated relays respectively associated with each branch, and an auxiliary relay, responsive to certain of the interrelated relays and to the main relay.

Upon the occurrence of a fault in any one branch, such as a short, the common relay responsive to the operation of the circuit breaker energizes certain of the relays respectively and commonly associated with each branch, the respective contacts of which when sequentially operated (1) initially remove the power from all of the branches (and loads), (2) close control paths to ascertain which branch (or branches) is defective and (3) disconnect the defective branch (or branches) from the power source and supply current to the restoring winding of the circuit breaker to re-establish power to all branches except the defective one (or ones).

The objects, features and advantages of this invention will become more fully understood from a consideration of the following description, together with the four-part schematic circuit drawing.

As depicted in the drawing, the multi-branch power restoring circuit is comprised of FIGS. 1A–1D in combination, and includes a common power source 11, a main relay R–3 responsive to the operation of a circuit breaker CB–1, and three branch circuits designated A, B and C respectively.

Three loads designated A, B and C, respectively, have been shown associated with the correspondingly lettered branches for purposes of illustration. These loads may in practice comprise any type, such as components, devices, circuits, transmission lines, or electrically driven apparatus.

Considering branch circuit A more specifically, it comprises three interrelated relays designated R–4A (FIG. 1A), R–5A (FIG. 1B), and R–6A (FIG. 1D).

The branch circuit B comprises three similar relays R–4B, R–5B and R–6B, and the branch circuit C comprises relays R–4C, R–5C and R–6C. An auxiliary relay RA–10 (FIG. 1C) responds both to relay R–3, and to two of the relays associated with a branch when it becomes defective, for example, relays R–4A and R–6A for the branch A.

The contacts and grounds associated with the various described relays, as well as their selective functions and interrelated circuit dependencies will be best understood, it is believed, if incorporated in a detailed description of the operation of the power restoring circuit.

It should be noted that detached relay contacts have been used throughout in the schematic circuit drawing and, in accordance with accepted and standard circuit drawing nomenclature, a cross along a circuit lead represents a make (normally open) contact, whereas a short perpendicular bar represents a break (normally closed) contact. The letter-number combination adjacent each contact identifies the relay associated therewith, and the number in parentheses identifies the particular contact of that relay.

With voltage initially applied from a suitable source 11 to the circuit breaker CB–1 (FIG. 1A), voltage is supplied to branch A via lead 21, break contact CB–1(1), lead 22, and break contacts R–4A(1) and R–5A(1). Voltage is similarly applied to branch B via lead 21, break contact CB–1(1), leads 23 and 24, and break contacts R–4B(1) and R–5B(1), and to branch C via lead 21, break contact CB–1(1), leads 23 and 25, and break contacts R–4C(1) and R–5C(1).

Upon the occurrence of a fault in any of the branches or associated loads, the break contact CB–1(1) opens due to an overload condition, and energizes the common branch relay R–3, which locks itself to ground through an early make contact R–3(1) in lead 28 and disconnects its winding from all of the loads by the actuation of break contact R–3(2), also in lead 28. The energization of relay R–3 in turn effects the energization of relays R–5A, R–5B and R–5C (FIG. 1B) through the actuation of make contact R–3(3) in a common lead 31, which completes an operating path from a voltage source 40 through the R–5 relays to ground. Make contact R–3(4) in the control lead 32 of relay RA–10 (FIG. 1C) partially completes a path to ground to effect the subsequent energization of that relay.

Relay R–5A operated actuates break contact R–5A(1) in lead 22 associated with branch A and thereby opens one of the two lines which feeds load A, the other line containing relay R–4A, which is of the marginal type, and in place thereof connects a positive voltage supply 35 through a make contact R–5A(2) in lead 36 to the winding of relay R–4A. Relay R–4A, being of a marginal type, and thereby requiring a predetermined amount of current above that normally drawn by the load A through lead 22, thus is only operated if the fault or short circuit is in load A, which would complete an effective path to ground or its equivalent. Conversely, if a short should develop in load B, relay R–4B would operate, whereas if a short developed in load C, relay R–4C would operate.

Relay R–5A (FIG. 1B), energized in response to the operation of R–3, also partially prepares an operating path through a make contact R–5A(3) in the common lead 38 connected to the restoring winding 39 of the circuit breaker CB-1. Relays R-5B and R-5C similarly partially prepare positive voltage operating paths to the restoring winding of the circuit breaker through contacts R-5B(3) and R-5C(3), respectively.

Relay R-4A associated with branch A, when operated, is further connected to the positive voltage supply 35 by the completion of a path through an early make contact R-4A(2) in a lead 39 which is parallel with a portion of lead 36 containing make contact R-5A(2). Relay R-4A operated disconnects the load A from the circuit breaker CB-1 by opening a break contact R-4A(1) in the lead 22. At the same time, relay R-4A completes an operating path to the restoring winding of the circuit breaker through lead 38 containing the previously actuated make contact R-5A(3) and a presently actuated make contact R-4A(4).

Relay R-4A further effects the energization of relay RA-10 (FIG. 1C) through the actuation of a make contact R-4A(5) in a lead 43, which contact completes an operating circuit path from a positive voltage source 45 to ground via leads 32 and 43. Finally, relay R-4A releases relay R-5A (R-5B or R-5C if relays R-4B or R-4C are respectively operated) through the actuation of a late break contact R-4A(3) serially connected in a lead 41, and effects the energization of relay R-6A (FIG. 1D) through the actuation of a late make contact R-4A(6) in a lead 46, which contact completes an operating path from a positive voltage source 50 to ground via a lead 47, lead 46 and a lead 48. The release of relay R-5A by the late break contact R-4A(3) opens the operating path to the restoring winding of CB-1 through the opening of make contact R-5A(3) in lead 38.

The energization of relay RA-10 (FIG. 1C) in turn effects the release of relay R-3 through actuation of a break contact RA-10(1) in lead 28, which contact removes the ground from relay R-3. The release of relay R-3 opens make contact R-3(3) in lead 31 common to the R-5 series of relays (FIG. 1B), which contact effects the de-energization of the remaining R-5 relays, i.e., R-5B and R-5C in the case of a defect in load A. These R-5 relays, as in the case of the R-5A relay previously de-energized by the opening of contact R-4A(3), effect the opening of the operating paths to the restoring winding of the circuit breaker CB-1 via the opening of make contacts R-5B(3) and R-5C(3).

Relay R-3, having been released by the operation of relay RA-10 and its associated contact RA-10(1) in lead 28, in turn opens the operating path of relay RA-10 through the operation of make contact R-3(4) in lead 32, as does also the actuation of a break contact R-6A(1) in lead 43.

It is thus seen that with a fault assumed to have occurred in branch A, the only relays remaining in an operating condition at the end of a complete operating cycle of the power restoring circuit are R-6A and R-4A. In the case of a fault occurring in branches B or C, relays R-6B and R-4B or R-6C and R-4C, respectively, remain operated at the end of a complete cycle.

Relays R-4A (R-4B or R-4C) once energized, will not be de-energized until a key 55 (FIG. 1A) is momentarily operated. Key 55 when operated will effect the release of relay R-4A which, in turn will de-energize relay R-6A (FIG. 1D) by opening the make contact R-4A(6) in lead 46 in the case of a fault in branch A.

In a summary, a simplified, reliable, multi-branch power restoring circuit has been illustrated and described which is capable of monitoring a plurality of branches, upon the occurrence of a fault, detecting which branch (and associated load) has been affected, then isolating such branch, and immediately thereafter restoring power to all branches other than the defective branch.

It is to be understood that the specific embodiment described herein is merely illustrative of the general principles of the present invention. Various other arrangements and modifications may be devised by one skilled in the art without departing from the spirit and scope of this invention.

What is claimed is:
1. A power restoring circuit comprising:
    a source of voltage,
    a plurality of network branches connected in parallel to said source,
    circuit breaker means electrically interposed between said source and said branches, said circuit breaker having a restoring winding for effecting the recycling thereof,
    a plurality of loads respectively connected to said branches,
    first actuating means connected between said source and said loads and responsive to said circuit breaker,
    a plurality of second actuating means respectively associated with each of said branches and responsive to the operation of said first actuating means to provide a partial electrical path to the restoring winding of said circuit breaker,
    a plurality of third actuating means normally and respectively connected in shunt with said branches and responsive to a fault condition occurring in the particular load associated therewith, any of said third actuating means when operated disconnecting the load associated therewith from said voltage source, completing an electrical path to the restoring winding of said circuit breaker to effect the recycling thereof so as to restore power to all branches other than the defective one, and disabling said second actuating means associated therewith,
    a fourth actuating means common to all of said branches and operable in response to said third actuating means,
    a plurality of fifth actuating means respectively associated with said branches, said fifth actuating means being responsive to the operation of said third actuating means associated therewith, and when operated, disabling said fourth actuating means which reconnects said first actuating means into said circuit in an operable condition responsive thereafter to the actuation of said circuit breaker.

2. A power restoring circuit in accordance with claim 1 wherein said first, second, third, fourth and fifth actuating means all comprise electromechanical relays.

References Cited by the Examiner
UNITED STATES PATENTS

| 3,127,542 | 3/1964 | Riebs | 317—22 |
| 3,144,585 | 11/1964 | Blakemore | 317—26 X |
| 3,229,164 | 1/1966 | McCartney et al. | 317—22 |
| 3,255,384 | 6/1966 | Riebs | 317—22 |

MILTON O. HIRSHFIELD, *Primary Examiner.*

R. V. LUPO, *Assistant Examiner.*